United States Patent
Nordin et al.

(10) Patent No.: US 7,636,050 B2
(45) Date of Patent: Dec. 22, 2009

(54) SYSTEMS AND METHODS FOR DETECTING A PATCH CORD END CONNECTION

(75) Inventors: Ronald A. Nordin, Naperville, IL (US); Brian D. Leshin, Mokena, IL (US)

(73) Assignee: Panduit Corp., Tinley Park, IL (US)

( * ) Notice: Subject to any disclaimer, the term of this patent is extended or adjusted under 35 U.S.C. 154(b) by 5 days.

(21) Appl. No.: 11/462,895

(22) Filed: Aug. 7, 2006

(65) Prior Publication Data
US 2007/0032124 A1 Feb. 8, 2007

Related U.S. Application Data

(60) Provisional application No. 60/706,029, filed on Aug. 8, 2005.

(51) Int. Cl.
*G08B 21/00* (2006.01)
(52) U.S. Cl. ................ 340/635; 340/644; 340/653
(58) Field of Classification Search ......... 340/500–502, 340/505, 514, 635, 644, 653; 361/686, 679.01, 361/679.02, 679.6
See application file for complete search history.

(56) References Cited

U.S. PATENT DOCUMENTS

| | | | |
|---|---|---|---|
| 3,052,842 A | 9/1962 | Frohman et al. | |
| 3,573,789 A | 4/1971 | Sharp et al. | |
| 3,573,792 A | 4/1971 | Reed et al. | |
| 3,914,561 A | 10/1975 | Schardt et al. | |
| 4,018,997 A | 4/1977 | Hoover et al. | |
| 4,072,827 A | 2/1978 | Oman | |
| 4,096,359 A | 6/1978 | Barsellotti | |
| 4,140,885 A | 2/1979 | Verhagen | |
| 4,196,316 A | 4/1980 | McEowen et al. | |
| 4,517,619 A | 5/1985 | Uekubo | |
| 4,673,246 A | 6/1987 | Schembri | |
| 4,773,867 A | 9/1988 | Keller et al. | |
| 4,796,294 A | 1/1989 | Nakagawara | |
| 4,869,566 A | 9/1989 | Juso et al. | |
| 4,901,004 A | 2/1990 | King | |
| 4,937,825 A | 6/1990 | Ballard et al. | |

(Continued)

FOREIGN PATENT DOCUMENTS

EP 0297079 3/1992

(Continued)

OTHER PUBLICATIONS

"RiT Technologies Ltd. SMART Cabling System," RiT Technologies Ltd., 2004.

(Continued)

*Primary Examiner*—Jennifer Mehmood
(74) *Attorney, Agent, or Firm*—Robert A. McCann; Zachary J. Smolinski; Christopher K. Marlow

(57) ABSTRACT

Systems and methods for detecting a patch cord connection are presented. The insertion of a patch cord into a device jack physically closes a circuit, thereby permitting determination of the patch cord connection. The connection of only one side of a patch cord to a jack is able to be determined. In addition, a particular jack with which a patch cord is connected is able to be determined.

9 Claims, 2 Drawing Sheets

U.S. PATENT DOCUMENTS

| | | | |
|---|---|---|---|
| 5,037,167 A | 8/1991 | Beaty | |
| 5,107,532 A | 4/1992 | Hansen et al. | |
| 5,111,408 A | 5/1992 | Amjadi | |
| 5,145,380 A | 9/1992 | Holcomb et al. | |
| 5,161,988 A | 11/1992 | Krupka | |
| 5,170,327 A | 12/1992 | Burroughs | |
| 5,204,929 A | 4/1993 | Machall et al. | |
| 5,222,164 A | 6/1993 | Bass, Sr. et al. | |
| 5,226,120 A | 7/1993 | Brown et al. | |
| 5,233,501 A | 8/1993 | Allen et al. | |
| 5,265,187 A | 11/1993 | Morin et al. | |
| 5,270,658 A | 12/1993 | Epstein | |
| 5,305,405 A | 4/1994 | Emmons et al. | |
| 5,312,273 A | 5/1994 | Andre et al. | |
| 5,353,367 A | 10/1994 | Czosnowski et al. | |
| 5,394,503 A | 2/1995 | Dietz, Jr. et al. | |
| 5,432,847 A | 7/1995 | Hill et al. | |
| 5,483,467 A | 1/1996 | Krupka et al. | |
| 5,487,666 A | 1/1996 | DiGiovanni | |
| 5,521,902 A | 5/1996 | Ferguson | |
| 5,532,603 A | 7/1996 | Bottman | |
| 5,546,282 A | 8/1996 | Hill et al. | |
| 5,550,755 A | 8/1996 | Martin et al. | |
| 5,583,874 A | 12/1996 | Smith et al. | |
| 5,684,796 A | 11/1997 | Abidi et al. | |
| 5,726,972 A | 3/1998 | Ferguson | |
| 5,727,055 A | 3/1998 | Ivie et al. | |
| 5,754,112 A | 5/1998 | Novak | |
| 5,764,043 A | 6/1998 | Czosnowski et al. | |
| 5,790,041 A | 8/1998 | Lee | |
| 5,832,071 A | 11/1998 | Voelker | |
| 5,847,557 A | 12/1998 | Fincher et al. | |
| 5,854,824 A | 12/1998 | Bengal et al. | |
| 5,870,626 A | 2/1999 | Lebeau | |
| 5,876,240 A | 3/1999 | Derstine et al. | |
| 5,878,030 A | 3/1999 | Norris | |
| 5,892,756 A | 4/1999 | Murphy | |
| 5,898,837 A | 4/1999 | Guttman et al. | |
| 5,915,993 A | 6/1999 | Belopolsky et al. | |
| 5,923,663 A | 7/1999 | Bontemps et al. | |
| 5,944,535 A | 8/1999 | Bullivant et al. | |
| 6,002,331 A | 12/1999 | Laor | |
| 6,041,352 A | 3/2000 | Burdick et al. | |
| 6,067,014 A | 5/2000 | Wilson | |
| 6,078,113 A | 6/2000 | True et al. | |
| 6,086,415 A | 7/2000 | Sanchez et al. | |
| 6,094,261 A | 7/2000 | Contarino, Jr. | |
| 6,175,865 B1 | 1/2001 | Dove et al. | |
| 6,222,908 B1 | 4/2001 | Bartolutti et al. | |
| 6,229,538 B1 | 5/2001 | McIntyre et al. | |
| 6,234,830 B1 | 5/2001 | Ensz et al. | |
| 6,243,510 B1 | 6/2001 | Rauch | |
| 6,244,907 B1 | 6/2001 | Arnett | |
| 6,285,293 B1 | 9/2001 | German et al. | |
| 6,330,307 B1 | 12/2001 | Bloch et al. | |
| 6,350,148 B1 | 2/2002 | Bartolutti et al. | |
| 6,381,283 B1 | 4/2002 | Bhardwaj et al. | |
| 6,421,322 B1 | 7/2002 | Koziy et al. | |
| 6,424,710 B1 | 7/2002 | Bartolutti et al. | |
| 6,434,716 B1 | 8/2002 | Johnson et al. | |
| 6,437,894 B1 | 8/2002 | Gilbert et al. | |
| 6,453,014 B1 | 9/2002 | Jacobson et al. | |
| 6,456,768 B1 | 9/2002 | Boncek et al. | |
| 6,499,861 B1 | 12/2002 | German et al. | |
| 6,522,737 B1 | 2/2003 | Bartolutti et al. | |
| 6,561,827 B2 | 5/2003 | Frostrom et al. | |
| 6,574,586 B1 | 6/2003 | David et al. | |
| 6,577,243 B1 | 6/2003 | Dannenmann et al. | |
| 6,601,097 B1 | 7/2003 | Cheston et al. | |
| 6,626,697 B1 | 9/2003 | Martin et al. | |
| 6,629,269 B1 | 9/2003 | Kahkoska | |
| 6,684,179 B1 | 1/2004 | David | |
| 6,688,910 B1 | 2/2004 | Macauley | |
| 6,714,698 B2 | 3/2004 | Pfeiffer et al. | |
| 6,725,177 B2 | 4/2004 | David et al. | |
| 6,750,643 B2 | 6/2004 | Hwang et al. | |
| 6,778,911 B2 | 8/2004 | Opsal et al. | |
| 6,784,802 B1 | 8/2004 | Stanescu | |
| 6,788,213 B2 * | 9/2004 | Menard | 340/644 |
| 6,798,944 B2 | 9/2004 | Pfeiffer et al. | |
| 6,802,735 B2 | 10/2004 | Pepe et al. | |
| 6,823,063 B2 | 11/2004 | Mendoza | |
| 6,857,897 B2 | 2/2005 | Conn | |
| 6,871,156 B2 | 3/2005 | Wallace et al. | |
| 6,898,368 B2 | 5/2005 | Columbo et al. | |
| 6,992,491 B1 | 1/2006 | Lo et al. | |
| 7,005,861 B1 | 2/2006 | Lo et al. | |
| 7,027,704 B2 | 4/2006 | Frohlich et al. | |
| 7,028,087 B2 | 4/2006 | Caveney | |
| 7,068,043 B1 | 6/2006 | Lo et al. | |
| 7,068,044 B1 | 6/2006 | Lo et al. | |
| 7,160,143 B2 | 1/2007 | David et al. | |
| 7,207,846 B2 | 4/2007 | Caveney et al. | |
| 7,234,944 B2 | 6/2007 | Nordin et al. | |
| 7,312,715 B2 * | 12/2007 | Shalts et al. | 340/635 |
| 7,519,003 B2 * | 4/2009 | Koziy et al. | 370/248 |
| 2002/0069277 A1 | 6/2002 | Caveney | |
| 2002/0071394 A1 | 6/2002 | Koziy et al. | |
| 2002/0090858 A1 | 7/2002 | Caveney | |
| 2002/0116485 A1 | 8/2002 | Black et al. | |
| 2003/0061393 A1 | 3/2003 | Steegmans et al. | |
| 2003/0152087 A1 | 8/2003 | Shahoumian et al. | |
| 2004/0052471 A1 | 3/2004 | Colombo et al. | |
| 2004/0065470 A1 | 4/2004 | Goodison et al. | |
| 2004/0073597 A1 | 4/2004 | Caveney et al. | |
| 2004/0077220 A1 | 4/2004 | Musolf et al. | |
| 2004/0219827 A1 | 11/2004 | David et al. | |
| 2005/0111491 A1 | 5/2005 | Caveney | |
| 2005/0136729 A1 | 6/2005 | Redfield et al. | |
| 2005/0141431 A1 | 6/2005 | Caveney et al. | |
| 2005/0195584 A1 | 9/2005 | AbuGhazaleh et al. | |
| 2005/0224585 A1 | 10/2005 | Durrant et al. | |
| 2005/0231325 A1 | 10/2005 | Durrant et al. | |
| 2005/0239339 A1 | 10/2005 | Pepe | |
| 2005/0245127 A1 | 11/2005 | Nordin et al. | |
| 2006/0047800 A1 | 3/2006 | Caveney et al. | |
| 2006/0282529 A1 | 12/2006 | Nordin | |
| 2007/0117444 A1 | 5/2007 | Caveney et al. | |
| 2007/0132503 A1 | 6/2007 | Nordin | |
| 2007/0207666 A1 | 9/2007 | Caveney et al. | |

FOREIGN PATENT DOCUMENTS

| | | |
|---|---|---|
| EP | 0575100 | 4/1998 |
| EP | 0745229 | 3/2003 |
| FR | 2680067 A1 | 8/1991 |
| GB | 2236398 | 4/1991 |
| GB | 2236398 A | 4/1991 |
| GB | 2347752 A | 9/2000 |
| JP | 676878 | 3/1994 |
| JP | 2004349184 | 12/2004 |
| WO | 9926426 A1 | 5/1999 |
| WO | 0060475 A1 | 10/2000 |
| WO | 01055854 A1 | 8/2001 |
| WO | 2004044599 | 5/2004 |
| WO | 2005072156 | 8/2005 |
| WO | 2006052686 A1 | 5/2006 |

OTHER PUBLICATIONS

"Ortronics Launches iTRACS—Ready Structured Cabling Solutions," News Release Mar. 7, 2003.

"The SYSTIMAX iPatch System—Intelligent yet simple patching . . . ", CommScope, Inc., 2004.

"White Paper—Intelligent Patching," David Wilson, Nov. 2002.

"PatchView for the Enterprise (PV4E) technical background/Networks for Business," Jun. 24-26, 2003.
"RiT Technologies Ltd. Go Patch-less," May 2000 Edition of Cabling Systems.
"Intelligent Cable Management Systems—Hot Topics—Trescray".
"Brand-Rex Network solutions Access racks Cat 5E6 cabling UK".
"Molex Premise Networks/Western Europe-Real Time Patching System," Molex Prem. Networks, 2001.
"Product of the Week—Molex's Real Time Patching System".
"EC&M Taking Note of Patch Panel Technology," Mark McElroy, Jun. 1, 1998.
"Intelligent Patching SMARTPatch for the Enterprise (SP4E)".
"Finding the Missing Link," Cabling Installation & Maintenance, Jun./Jul. 2002.
"IntelliMAC-The New Intelligent Cable Management Solution by ITRACS&NORDX/CDT," Press Release 2003.
"Intelligent Cable Management Systems—Hot Topics—Trescray", 2004.
"Brand-Rex Network solutions Access racks Cat 5E6 cabling UK", 2004.
"Product of the Week—Molex's Real Time Patching System", 2004.
"Intelligent Patching SMARTPatch for the Enterprise (SP4E)", 2004.

* cited by examiner

SYSTEMS AND METHODS FOR DETECTING A PATCH CORD END CONNECTION

CROSS-REFERENCE TO RELATED APPLICATION

This application claims the benefit of priority to U.S. Provisional Patent Application Ser. No. 60/706,029, filed Aug. 8, 2005, which is incorporated herein by reference in its entirety. In addition, this application is related to U.S. patent application Ser. No. 11/265,316, filed Nov. 2, 2005, which claims the benefit of priority to U.S. Provisional Patent Application Ser. No. 60/624,753, filed Nov. 3, 2004, both of which are incorporated herein by reference in their entireties.

TECHNICAL FIELD

Related technical fields include patch cord systems.

BACKGROUND

FIGS. 1-3 show the current connecting hardware technology in 9th wire patch cord management systems. 9th wire systems are disclosed for example in U.S. patent application Ser. No. 11/423,826, filed Jun. 13, 2006, which claims the benefit of priority to U.S. Provisional Patent Application Ser. No. 60/690,149, filed Jun. 14, 2005, both of which are incorporated herein by reference in their entirety. As shown in FIG. 1, a typical 9th wire patch cord 150 includes a patch plug 140 that may be inserted into a patch jack 145 of a panel 130. The patch cord also includes a 9th wire 115 connected to a 9th wire cord contact 115. When inserted, the patch plug 140 electrically connects to the patch jack 145, thereby allowing communication from the patch cord 150 to the panel 130. Furthermore, when inserted, the 9th wire cord contact 115 connects to the 9th wire panel contact 120.

As shown in the simplified top views of FIGS. 2 and 3, upon connection, the 9th wire cord contact 115 of the 9th wire 110 may be introduced between a first portion 120a and a second portion 120b of the 9th wire panel contact 120. When introduced, the 9th wire cord contact 115 forms an electrical connection with the 9th wire panel contact 120. As a result of the electrical connection, the 9th wire 110 is electrically connected to a first transceiver 300.

Similarly, as shown in FIG. 3, an opposite end of the 9th wire cord includes a second 9th wire cord contact 116. The second 9th wire cord contact 116 of the 9th wire 110 may be introduced between a first portion 121a and a second portion 121b of a second 9th wire panel contact connected to a second panel 131. When introduced, the second 9th wire cord contact 116 forms an electrical connection with second the 9th wire panel contact. As result of the electrical connection, the 9th wire 110 is electrically connected to a second transceiver 301.

The above systems and methods for determining where each plug of a patch cord is connected rely on the transceivers 300, 301 communicating with each other. Thus, when both plugs 140 of a patch cord 150 are inserted their respective panels 130, 131, an electrical circuit is formed and the transceivers 300, 301 can communicate with each other. When either plug 140 of a patch cord 150 is removed from its corresponding patch jack 145, the $9^{th}$ wire circuit is broken and the transceivers 300, 301 cannot communicate with each other. As a result, the only conclusions the system can make are that both plugs of a patch cord have been installed or that one end of a patch cord has been removed.

Some conventional systems and methods for determining whether a patch cord is connected have attempted to use complicated plug sensors such as electromagnetic radiation (visible light) transceivers, magnetic detectors, code reading sensors, and physical sensors. See, for example, U.S. Pat. Nos. 6,424,710; 6,222,908; 6,285,293; and 6,350,148. However, these systems rely on non-electrical sensors and are not for use with 9th wire patch cord systems.

SUMMARY

The above systems and methods for determining whether a patch cord is connected have at least one or more of the following problems. First, the system cannot electrically detect when only one side (plug) of a previously un-connected patch cord is inserted into a jack. Second, the system cannot electrically detect when both sides of a previously connected patch cord have been removed.

Accordingly, it is beneficial to provide systems and methods for detecting a patch cord connection that can simply and reliably determine the above and in addition determine when only one side of a patch cord is connected to a jack.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
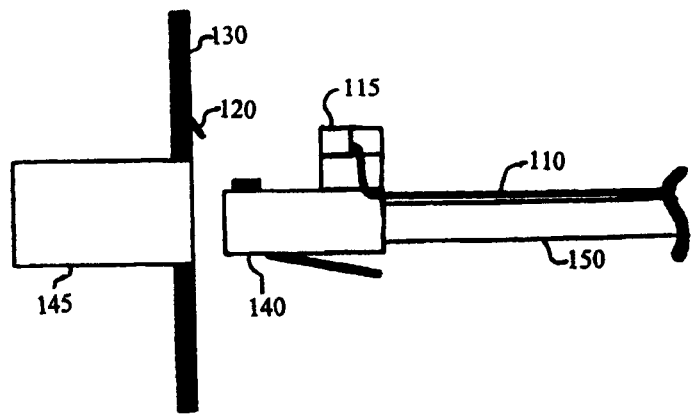
FIG. 1 shows an example of a conventional patch cord and panel.
Figure 2:
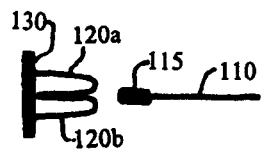
FIG. 2 shows a simplified top view of a conventional 9th wire and 9th wire panel contact.
Figure 3:
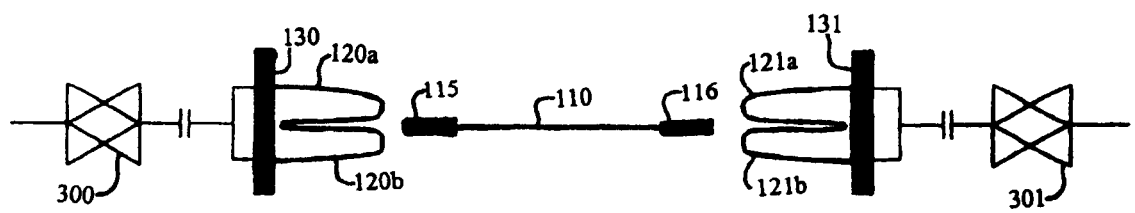
FIG. 3 shows a simplified top view of a conventional 9th wire and two 9th wire panel contacts.
Figure 4:
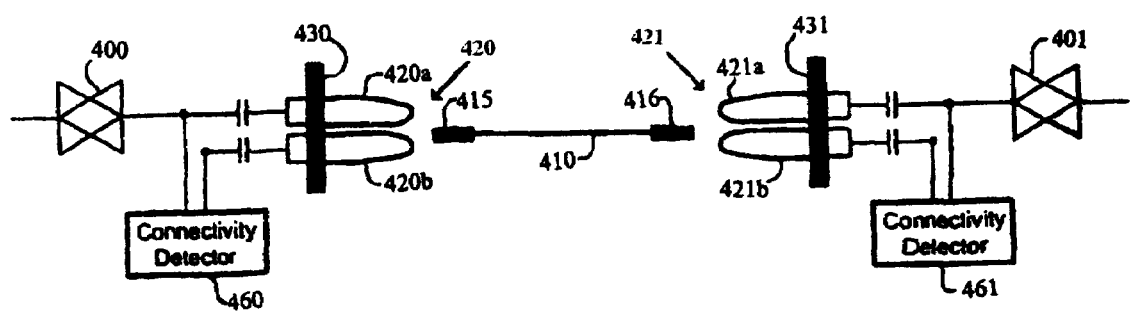
FIG. 4 shows a simplified top view of an exemplary 9th wire connection detection system.

FIG. 4 shows a simplified top view of an exemplary 9th wire connection detection system according to an exemplary implementation of the principles described herein. For convenience, only the 9th wire and associated 9th wire panel contacts are shown; the general patch cord, including the patch plug, is not shown. As shown in FIG. 4, the 9th wire 410 terminates with a first and a second 9th wire cord contact 415, 416. Each of the 9th wire panel contacts 420, 421 have two portions, a first portion 420a and a second portion 420b for the first 9th wire panel contact 420 and a first portion 421a and a second portion 421b for the second 9th wire panel contact 421. Unlike the above 9th wire system shown in FIGS. 1-3, the first and second portions 420a, 420b of the first 9th wire panel contact 420 are normally electrically isolated from each other. Similarly, the second portions 421a and 421b of the second 9th wire panel contact 421 are normally electrically isolated from each other. The electrical isolation may occur from a physical separation between each first portion 420a, 421a and the corresponding second portion 420b, 421b.

Each of the first portions 420a, 421a are electrically connected to respective connectivity detectors 460, 461. Similarly, each of the second portions 420b and 421b are electrically connected to the respective connectivity detectors 460, 461. As a result each panel 430, 431 of the 9th wire system contains an open circuit. For example, the first panel 430 includes an open circuit beginning at the first portion 420a of the first 9th wire panel contact. As shown in FIG. 4, the circuit continues to the connectivity detector 460 and returns to the second portion 420b of the first 9th wire panel contact.

As a result of the 9th wire panel contact's location, when a patch plug of a patch cord is inserted into a jack, the 9th wire cord contact, e.g., 9th wire cord contact 415 shown in FIG. 4, is introduced between the first portion 420a and second portion 420b of the 9th wire panel contact. It should be appreciated that the 9th wire cord contact 415 may be made from any suitable electrically conductive material. As a result of the 9th wire cord contact 415 being introduced between the first portion 420a and second portion 420b of the 9th wire panel contact 420, the circuit including the first portion 420a, the second portion 420b, and the connectivity detector 460 of the panel 430 is closed.

Each of the connectivity detectors 460, 461 is capable of detecting the open or closed nature of their respective circuits. Thus, when a 9th wire cord contact 415, 416 is introduced between the respective portions 420a, 420b, 421a, 421b of their respective 9th wire panel contacts, the connectivity detectors will detect that the circuit has been closed. When a connectivity detector 460, 461 detects that a circuit is closed, it concludes that a patch plug has been inserted into its corresponding patch jack. For example, one or more of the connectivity detectors 460, 461 may be connected to a controller (not shown) that monitors the status of each connectivity detector 460, 461 to determine whether or not a patch plug has been inserted into the patch jack that the connectivity detector 460, 461 is monitoring. Alternatively, one or more of the connectivity detectors 460, 461 may be combined into a single connectivity detector capable of monitoring a plurality of circuits.

Furthermore, the exemplary system is also capable of determining whether both ends of a patch cord are plugged into patch jacks. As shown in FIG. 4, one of the portions of each 9th wire panel contact (420a and 420b in FIG. 4) may be connected to transceivers 400, 401. One or more of the transceivers may be connected to a controller (not shown). When, for example, the transceiver 400 is capable of communicating with the transceiver 401, it may be determined that one end of a patch cord is inserted into the patch jack corresponding to the transceiver 400 and the other end of the patch cord is inserted into the patch jack corresponding to the transceiver 401.

Figure 5:
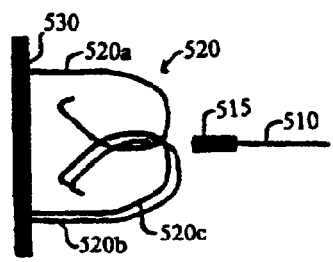
FIG. 5 shows a simplified top view of an exemplary 9th wire and 9th wire panel contact.
Figure 6:
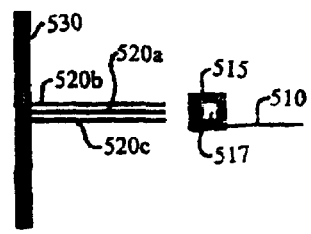
FIG. 6 shows a simplified side view of an exemplary 9th wire and 9th wire panel contact.
Figure 7:
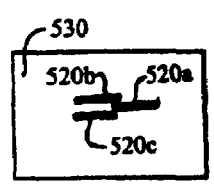
FIG. 7 shows a simplified front view of an exemplary 9th wire panel contact.

FIGS. 5-7 show an exemplary structure of a 9th wire panel contact 520 and 9th wire cord contact 515. FIG. 5 shows the 9th wire panel contact 520 and 9th wire cord contact 515 from above, FIG. 6 shows the 9th wire panel contact 520 and 9th wire cord contact 515 from the side, and FIG. 7 shows the 9th wire panel contact 520 from the front.

As shown in FIGS. 5-7, the exemplary 9th wire panel contact 520 may include a first portion 520a, a second portion 520b, and a third portion 520c. Each of the first portion 520a, second portion 520b, and third portion 520c may be arranged such that when viewed from the front or side (FIGS. 6 and 7) the first portion 520a may be located between the second portion 520b and third portion 520c, and each of the first portion 520a, second portion 520b, and third portion 520c may be substantially parallel. As used herein, the term "substantially parallel" is intended to encompass all orientations of the portions 520a, 520b, 520c in which the first portion 520a, second portion 520b, and third portion 520c do not touch one another. Accordingly, an orientation in which the first portion 520a, second portion 520b, and third portion 520c are not geometrically parallel, but are not touching is contemplated by the term "substantially parallel."

Furthermore, as shown in FIGS. 5 and 7, when viewed from above, the first portion 520a may intersect and/or cross the second portion 520b and/or third portion 520c. Thus, when the portions 520a, 520b, 520c are made from a resilient conductive material, such as metal wire, and a 9th wire contact 515 is introduced between the portions 520a, 520b, 520c, thereby separating the portions 520a, 520b, 520c. The portions 520a, 520b, 520c, in turn, exert an inward force against the surface of the 9th wire contact 515, thereby ensuring an electrical connection.

As shown in FIG. 5, the 9th wire contact 515 may be thin when viewed from above to facilitate the 9th wire contact 515 being inserted between the portions 520a and the portions 520b, 520c. Furthermore, as shown in FIG. 6, the 9th wire contact may be tall enough to effectively contact each of the portions 520a, 520b, 520c.

The 9th wire contact 515 may include a hole or indentation 517 in which the curved overlapping sections of the portions 520a, 520b, 520c may nestle within. As a result of the curved overlapping sections of the portions 520a, 520b, 520c nestling within the hole or indentation 517, the curved overlapping sections of the portions 520a, 520b, 520c resist longitudinal motion of the 9th wire contact 515. Accordingly, the curved overlapping sections of the portions 520a, 520b, 520c may resist the 9th wire contact 515 from being accidentally inserted too far into the 9th wire panel contact, or being accidentally removed from the 9th wire panel contact without the corresponding patch plug being removed form the patch jack.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, although exemplary configurations of the 9th wire panel contact and the 9th wire contact are set forth above, different configurations, including those now known and later developed, may be used as long as the 9th wire contact, or any other portion of the patch cord, is configured to close an open in a circuit that exists as a result of the configuration of the 9th wire panel contact.

Furthermore, although the examples shown in FIGS. 4-7 utilize two or three portions of the 9th wire panel contact, more than three portions may be used as well.

The above examples focus on 9th wire patch cord systems; however, the broad principles described above are applicable to patch cords having any number of wires. For example, an eight-wire patch cord may be used in conjunction with a conductive member attached to the jack that may complete an open circuit that exists as a result of the configuration of a panel contact.

We claim:

1. A patch panel comprising:
 a 9th wire panel contact having a contact area adapted to accept a 9th wire cord contact; and
 a circuit that includes conductors disposed in the contact area, the conductors configured to change a state of electrical contact therebetween upon insertion of a first end of the 9th wire cord contact therein thereby changing a state of the circuit while a second end of the ninth wire cord contact remains uninserted, the conductors comprising a first, second, and third overlapping portions wherein the first portion is located between the second and third portions when viewed from a front, a portion of the first conductor crosses a portion of the second conductor when viewed from a top, and the first portion, second portion, and third portion are substantially parallel when viewed from a side.

2. The patch panel of claim 1 wherein the 9th wire panel contact is configured to close an open in the circuit upon insertion of the 9th wire cord contact therein.

3. The patch panel of claim 1 wherein the 9th wire panel contact comprises a resilient conductive material disposed such that the resilient conductive material exerts an inward force against the 9th wire cord contact when the 9th wire cord contact is inserted into the 9th wire panel contact.

4. The patch panel of claim 1 wherein the 9th wire panel contact comprises a resilient conductive material disposed such that the resilient conductive material resists longitudinal motion of the 9th wire cord contact after the 9th wire cord contact has been inserted a predetermined distance into the contact area.

5. The patch panel of claim 1 further comprising a connectivity detector connected between the conductors, the circuit including the connectivity detector and the conductors, the connectivity detector adapted to detect whether the circuit is open or closed.

6. A patch panel comprising:
a contact area adapted to accept a patch cord contact;
conductors disposed within the contact area, the conductors configured to change a state of electrical contact upon insertion of a first end of the patch cord contact into the contact area while a second end of the ninth wire cord contact remains uninserted, the conductors comprising a first, second, and third overlapping portions wherein the first portion is located between the second and third portions when viewed from a front, a portion of the first conductor crosses a portion of the second conductor when viewed from a top, and the first portion, second portion, and third portion are substantially parallel when viewed from a side; and
a connectivity detector connected between the conductors to form a circuit, the connectivity detector adapted to detect whether the circuit is open or closed.

7. The patch panel of claim 6 wherein the conductors are configured to close an open in the circuit upon insertion of the patch cord contact therein.

8. The patch panel of claim 6 wherein the conductors are disposed such that the conductors exert an inward force against the patch cord contact when the patch cord contact is inserted into the contact area.

9. The patch panel of claim 6 wherein the conductors are disposed such that the conductors resist longitudinal motion of the patch cord contact after the patch cord contact has been inserted a predetermined distance into the contact area.

* * * * *